US012641570B1

(12) United States Patent
 Kuo

(10) Patent No.: US 12,641,570 B1
(45) Date of Patent: May 26, 2026

(54) METHOD AND APPARATUS FOR RELEASING PAGING INFORMATION IN A WIRELESS COMMUNICATION SYSTEM

(71) Applicant: ASUS Technology Licensing Inc., Taipei City (TW)

(72) Inventor: Richard Lee-Chee Kuo, Taipei City (TW)

(73) Assignee: ASUS Technology Licensing Inc., Taipei City (TW)

( * ) Notice: Subject to any disclaimer, the term of this patent is extended or adjusted under 35 U.S.C. 154(b) by 0 days.

(21) Appl. No.: 19/400,547

(22) Filed: Nov. 25, 2025

Related U.S. Application Data

(60) Provisional application No. 63/745,641, filed on Jan. 15, 2025.

(51) Int. Cl.
 *H04W 68/02* (2009.01)
 *H04W 72/25* (2023.01)
(52) U.S. Cl.
 CPC ........... *H04W 68/02* (2013.01); *H04W 72/25* (2023.01)
(58) Field of Classification Search
 CPC ..... H04W 76/15; H04W 76/19; H04W 84/20; H04W 36/0069; H04W 36/08; H04W 24/02; H04W 24/08; H04W 76/18; H04W 76/30; H04W 36/00698; H04W 36/305; H04W 84/18; H04W 76/10; H04W 76/34; H04W 36/0058; H04W 4/02; H04W 76/25; H04W 92/10; H04W 76/14; H04W 16/14; H04W 36/0061; H04W 52/0212;
 (Continued)

(56) References Cited

U.S. PATENT DOCUMENTS

2015/0365994 A1 * 12/2015 Yu ..................... H04W 72/1268
                                                           370/336
2023/0063453 A1    3/2023 Back et al.
                        (Continued)

FOREIGN PATENT DOCUMENTS

WO       2025021598       1/2025

OTHER PUBLICATIONS

MediaTek Inc. "Introduction of Sidelink Relay", R2-220wxyz, Source to TSG: RAN2, Work item code: NR_SL_relay-Core, 3GPP TSG-RAN WG2 Meeting #117 Electronic Online Meeting, Feb. 21-Mar. 3, 2022, R2-220wxyz.
(Continued)

*Primary Examiner* — Kwasi Karikari
(74) *Attorney, Agent, or Firm* — Blue Capital Law Firm, P.C.

(57) ABSTRACT

A method and device for an Intermediate UE-to-Network (U2N) Relay User Equipment (UE) are disclosed. In one embodiment, the Intermediate U2N Relay UE establishes a first PC5 connection with a Remote UE and establishes a second PC5 connection with a last U2N Relay UE. The Intermediate U2N Relay UE also receives paging information from the Remote UE. Furthermore, the Intermediate U2N Relay UE transmits the paging information received from the Remote UE to the last U2N Relay UE. In addition, the Intermediate U2N Relay UE detects a radio link failure to the first PC5 connection with the Remote UE. Also, the Intermediate U2N Relay UE transmits information indicating a paging information release associated with the Remote UE to the last U2N Relay UE in response to detecting the radio link failure.

16 Claims, 12 Drawing Sheets

(58) Field of Classification Search
CPC ........... H04W 36/00692; H04W 36/22; H04W 36/00; H04W 36/04; H04W 76/12; H04W 74/0808; H04W 8/005; H04W 84/047; H04W 40/248; H04W 56/0015; H04W 4/40; H04W 36/03; H04W 60/06; H04W 28/0236; H04W 36/302; H04W 4/023; H04W 40/20; H04W 48/04; H04W 74/0816; H04W 60/04; H04W 72/02; H04W 72/25; H04W 74/06; H04W 74/085; H04W 76/28; H04W 76/32; H04W 76/40
See application file for complete search history.

(56) References Cited

U.S. PATENT DOCUMENTS

| | | | |
|---|---|---|---|
| 2024/0049009 A1* | 2/2024 | Cheng ................... | H04W 92/18 |
| 2025/0039970 A1* | 1/2025 | Li ........................ | H04W 88/04 |
| 2025/0185121 A1* | 6/2025 | Orsino ................. | H04W 76/10 |
| 2025/0280308 A1* | 9/2025 | Zhao .................... | H04W 76/15 |

OTHER PUBLICATIONS

CATT "[AT121bis-e][413][POS] Positioning for remote UEs (CATT)", Agenda Item: 7.24.2, WID/SID: NR TEI18, R2-23xxxxx, 3GPP TSG-RAN WG2, Meeting #121bis-e, Online Meeting, Apr. 17-26, 2023.

* cited by examiner

METHOD AND APPARATUS FOR RELEASING PAGING INFORMATION IN A WIRELESS COMMUNICATION SYSTEM

CROSS-REFERENCE TO RELATED APPLICATIONS

The present Application claims the benefit of U.S. Provisional Patent Application Ser. No. 63/745,641 filed on Jan. 15, 2025, the entire disclosure of which is incorporated herein in its entirety by reference.

FIELD

This disclosure generally relates to wireless communication networks, and more particularly, to a method and apparatus for releasing paging information in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for an Intermediate UE-to-Network (U2N) Relay User Equipment (UE) are disclosed. In one embodiment, the Intermediate U2N Relay UE establishes a first PC5 connection with a Remote UE and establishes a second PC5 connection with a last U2N Relay UE. The Intermediate U2N Relay UE also receives paging information from the Remote UE. Furthermore, the Intermediate U2N Relay UE transmits the paging information received from the Remote UE to the last U2N Relay UE. In addition, the Intermediate U2N Relay UE detects a radio link failure to the first PC5 connection with the Remote UE. Also, the Intermediate U2N Relay UE transmits information indicating a paging information release associated with the Remote UE to the last U2N Relay UE in response to detecting the radio link failure.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: 3GPP TS 38.300 V18.1.0, "NR; NR and NG-RAN Overall Description; Stage 2 (Release 18)"; 3GPP TS 38.331 V18.1.0, "NR; Radio Resource Control (RRC) protocol specification (Release 18)"; 3GPP R2-2407295, "Control plane procedures for multi-hop relay"; R2-xxxxxxx Report of [POST128][401] [Relay] Control_Plane_v0_Rapp; and 3GPP TR 23.700-03 V1.0.0, "Study on system enhancement for Proximity based Services (ProSe) in the 5G System (5GS) Phase 3 (Release 19)". The standards and documents listed above are hereby expressly incorporated by reference in their entirety.

Figure 1:
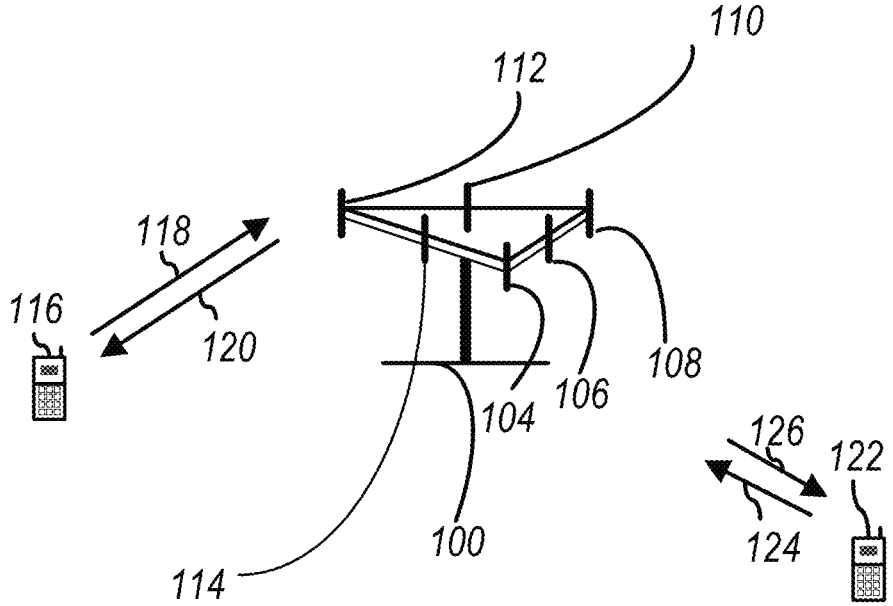
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
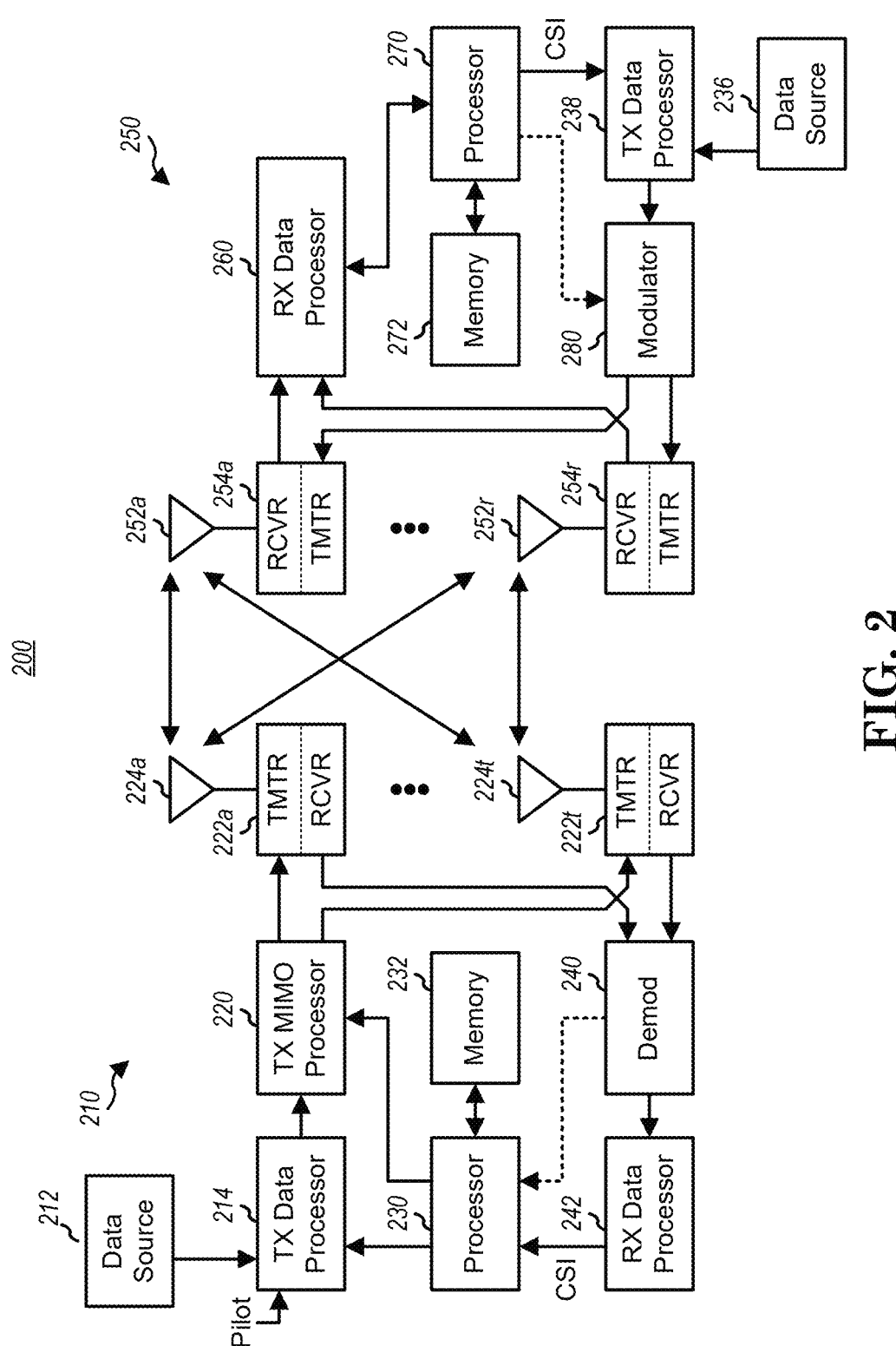
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
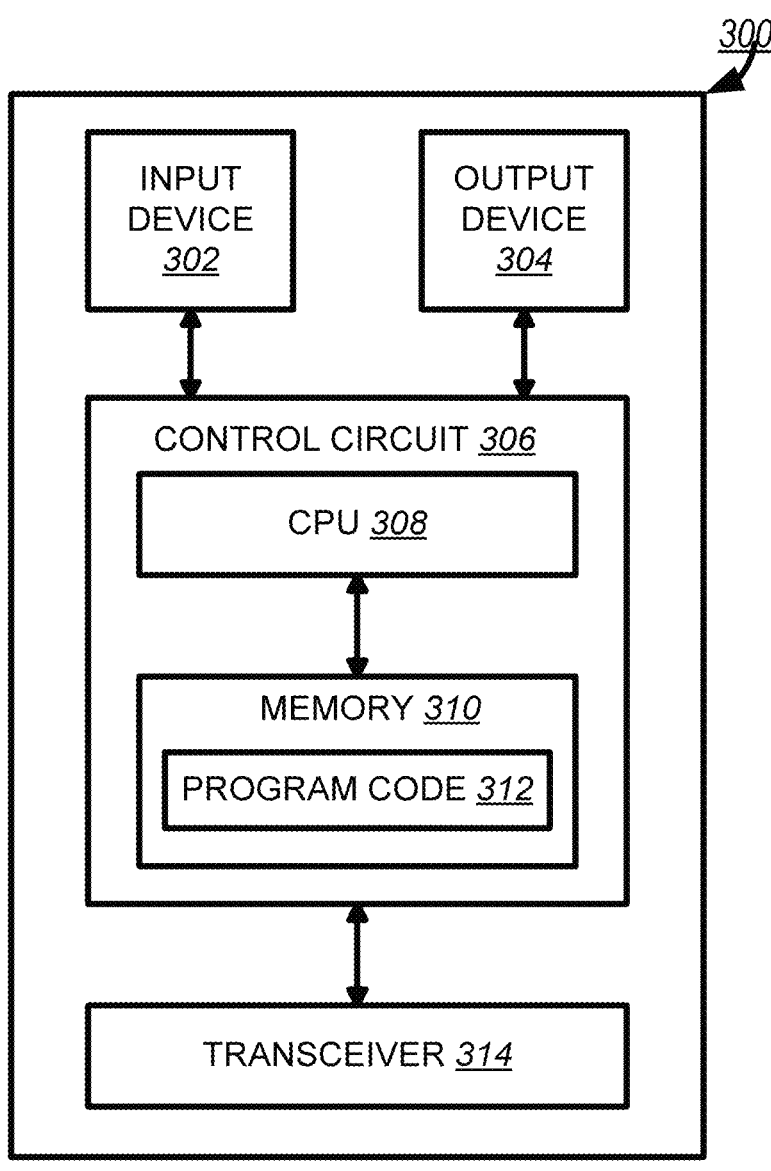
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
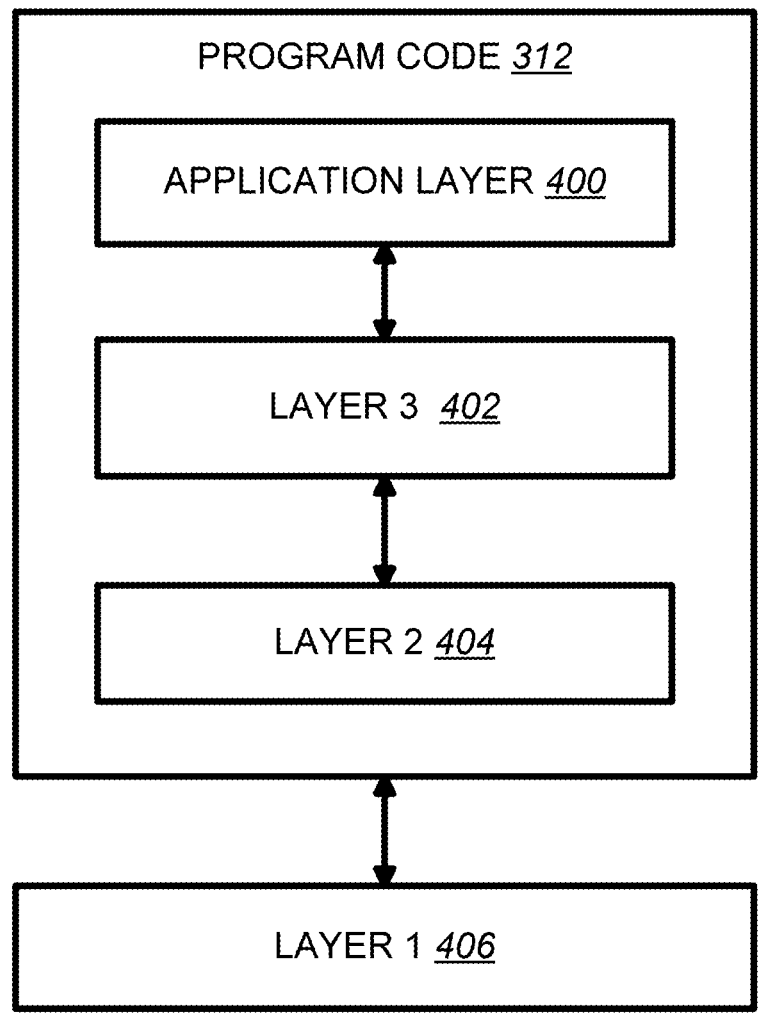
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.300 specifies procedures related to single-hop UE-to-Network (U2N) Relay in Release 17 as follows:

16.12 Sidelink Relay 16.12.1 General

Sidelink relay supports 5G ProSe UE-to-Network Relay (U2N Relay) function (specified in TS 23.304 [48]) to provide connectivity to the network for U2N Remote UE(s). Both L2 and L3 U2N Relay architectures are supported. The L3 U2N Relay architecture is transparent to the serving NG-RAN of the U2N Relay UE, except for controlling sidelink resources. The detailed architecture and procedures for L3 U2N Relay can be found in TS 23.304 [48].

A U2N Relay UE shall be in RRC_CONNECTED to perform relaying of unicast data.

For L2 U2N Relay operation, the following RRC state combinations are supported:

Both L2 U2N Relay UE and L2 U2N Remote UE shall be in RRC_CONNECTED to perform transmission/reception of relayed unicast data; and The L2 U2N Relay UE can be in RRC_IDLE, RRC_INACTIVE or RRC_CONNECTED as long as all the L2 U2N Remote UE(s) that are connected to the L2 U2N Relay UE are either in RRC_INACTIVE or in RRC_IDLE.

A single unicast link is established between one L2 U2N Relay UE and one L2 U2N Remote UE. The traffic to the NG-RAN of L2 U2N Remote UE via a given L2 U2N Relay UE and the traffic of the L2 U2N Relay UE shall be separated in different Uu RLC channels.

For L2 U2N Relay, the L2 U2N Remote UE can only be configured to use resource allocation mode 2 (as specified in 5.7.2 and 16.9.3.1) for data to be relayed.

[ . . . ]

16.12.2 Protocol Architecture 16.12.2.1 L2 UE-to-Network Relay

The protocol stacks for the user plane and control plane of L2 U2N Relay architecture are illustrated in FIG. 16.12.2.1-1 and FIG. 16.12.2.1-2. The SRAP sublayer is placed above the RLC sublayer for both CP and UP at both PC5 interface and Uu interface. The Uu SDAP, PDCP and RRC are terminated between L2 U2N Remote UE and gNB, while SRAP, RLC, MAC and PHY are terminated in each hop (i.e., the link between L2 U2N Remote UE and the L2 U2N Relay UE and the link between L2 U2N Relay UE and the gNB).

For L2 U2N Relay, the SRAP sublayer over PC5 hop is only for the purpose of bearer mapping. The SRAP sublayer is not present over PC5 hop for relaying the L2 U2N Remote UE's message on BCCH and PCCH. For L2 U2N Remote UE's message on SRB0, the SRAP header is not present over PC5 hop, but the SRAP header is present over Uu hop for both DL and UL.

Figure 5:
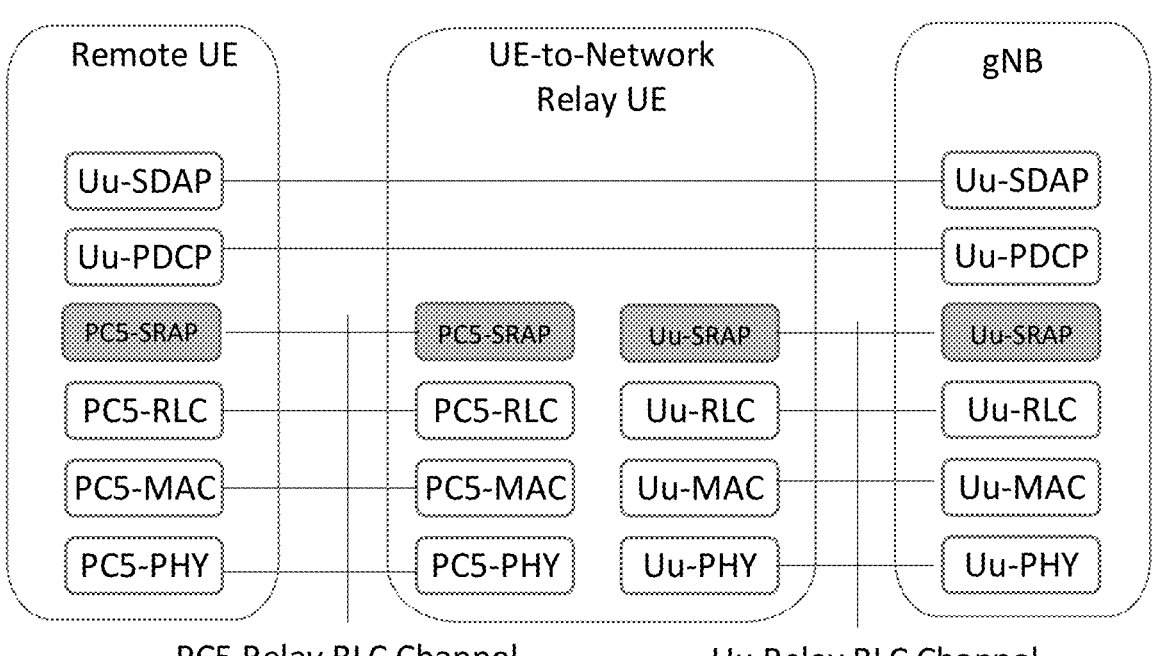
FIG. 5 is a reproduction of FIG. 16.12.2.1-1 of 3GPP 38.300 V18.1.0.

[FIG. 16.12.2.1-1 of 3GPP 38.300 V18.1.0, Entitled "User Plane Protocol Stack for L2 UE-to-Network Relay", is Reproduced as FIG. 5]

Figure 6:
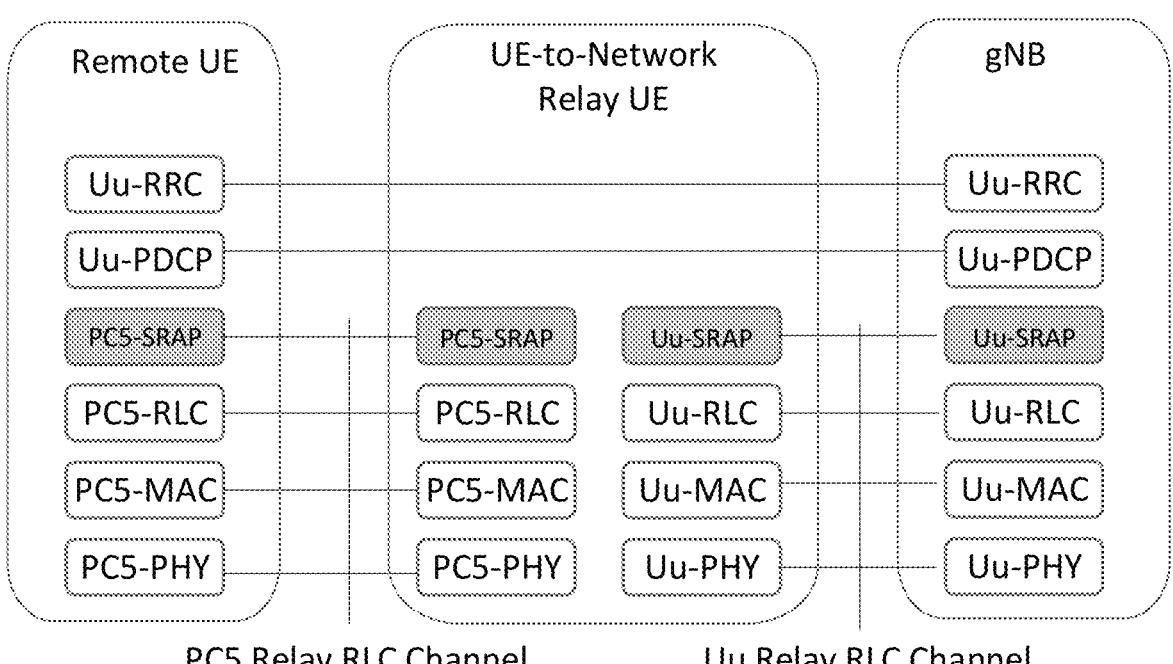
FIG. 6 is a reproduction of FIG. 16.12.2.1-2 of 3GPP 38.300 V18.1.0.

[FIG. 16.12.2.1-2 of 3GPP 38.300 V18.1.0, Entitled "Control Plane Protocol Stack for L2 UE-to-Network Relay", is Reproduced as FIG. 6]

For L2 U2N Relay, for uplink:

The Uu SRAP sublayer performs UL bearer mapping between end-to-end Uu Radio Bearers of L2 U2N remote UE (identified for the purposes of this mapping by the local Remote UE ID and an associated bearer ID) and egress Uu Relay RLC channels over the L2 U2N Relay UE Uu interface. For uplink relaying traffic, the different end-to-end Uu Radio Bearers (SRBs or DRBs) of the same L2 U2N Remote UE and/or different L2 U2N Remote UEs can be multiplexed over the same egress Uu Relay RLC channel;

The Uu SRAP sublayer supports L2 U2N Remote UE identification for the UL traffic. The identity information of L2 U2N Remote UE end-to-end Uu Radio Bearer and a local Remote UE ID are included in the Uu SRAP header at UL in order for gNB to correlate the received packets for the specific PDCP entity associated with the right end-to-end Uu Radio Bearer of the L2 U2N Remote UE;

The PC5 SRAP sublayer at the L2 U2N Remote UE supports UL bearer mapping between L2 U2N Remote UE end-to-end Uu Radio Bearers and egress PC5 Relay RLC channels.

For L2 U2N Relay, for downlink:

The Uu SRAP sublayer performs DL bearer mapping at gNB to map end-to-end Uu Radio Bearer (SRB, DRB) of L2 U2N Remote UE (identified for the purposes of this mapping by the local Remote UE ID and an associated bearer ID) into Uu Relay RLC channel. The Uu SRAP sublayer performs DL bearer mapping and data multiplexing between multiple end-to-end Radio Bearers (SRBs or DRBs) of a L2 U2N Remote UE and/or different L2 U2N Remote UEs and one Uu Relay RLC channel over the L2 U2N Relay UE Uu interface;

The Uu SRAP sublayer supports L2 U2N Remote UE identification for DL traffic. The identity information of L2 U2N Remote UE end-to-end Uu Radio Bearer and a local Remote UE ID are included into the Uu SRAP header by the gNB at DL for the L2 U2N Relay UE to identify the corresponding end-to-end Uu Radio Bearer(s) of L2 U2N Remote UE;

The PC5 SRAP sublayer at the L2 U2N Relay UE performs DL bearer mapping between end-to-end Uu Radio Bearers of L2 U2N remote UE and egress PC5 Relay RLC channels;

The PC5 SRAP sublayer at the L2 U2N Remote UE correlates the received packets with the right PDCP entity associated with the given end-to-end Uu Radio Bearer of the L2 U2N Remote UE based on the identity information included in the PC5 SRAP header.

A local Remote UE ID is included in both PC5 SRAP header and Uu SRAP header. L2 U2N Relay UE is configured by the gNB with the local Remote UE ID(s) to be used in SRAP header. L2 U2N Remote UE obtains the local Remote ID from the gNB via Uu RRC messages including RRCSetup, RRCReconfiguration, RRCResume and RRCReestablishment.

The end-to-end DRB(s) or end-to-end SRB(s), except SRB0, of L2 U2N Remote UE can be multiplexed to the PC5 Relay RLC channels and Uu Relay RLC channels in both PC5 hop and Uu hop, but an end-to-end DRB and an end-to-end SRB can neither be mapped into the same PC5 Relay RLC channel nor be mapped into the same Uu Relay RLC channel.

It is the gNB responsibility to avoid collision on the usage of local Remote UE ID. The gNB can update the local Remote UE ID by sending the updated local Remote UE ID via RRCReconfiguration message. The serving gNB can perform local Remote UE ID update independent of the PC5 unicast link L2 ID update procedure.

[ . . . ]

16.12.5 Control Plane Procedures for L2 U2N Relay
16.12.5.1 RRC Connection Management The L2 U2N Remote UE needs to establish its own PDU sessions/DRBs with the network before user plane data transmission.

The NR sidelink PC5 unicast link establishment procedures can be used to setup a secure unicast link between L2 U2N Remote UE and L2 U2N Relay UE before L2 U2N Remote UE establishes a Uu RRC connection with the network via L2 U2N Relay UE.

The establishment of Uu SRB1/SRB2 and DRB of the L2 U2N Remote UE is subject to Uu configuration procedures for L2 UE-to-Network Relay.

Figure 7:
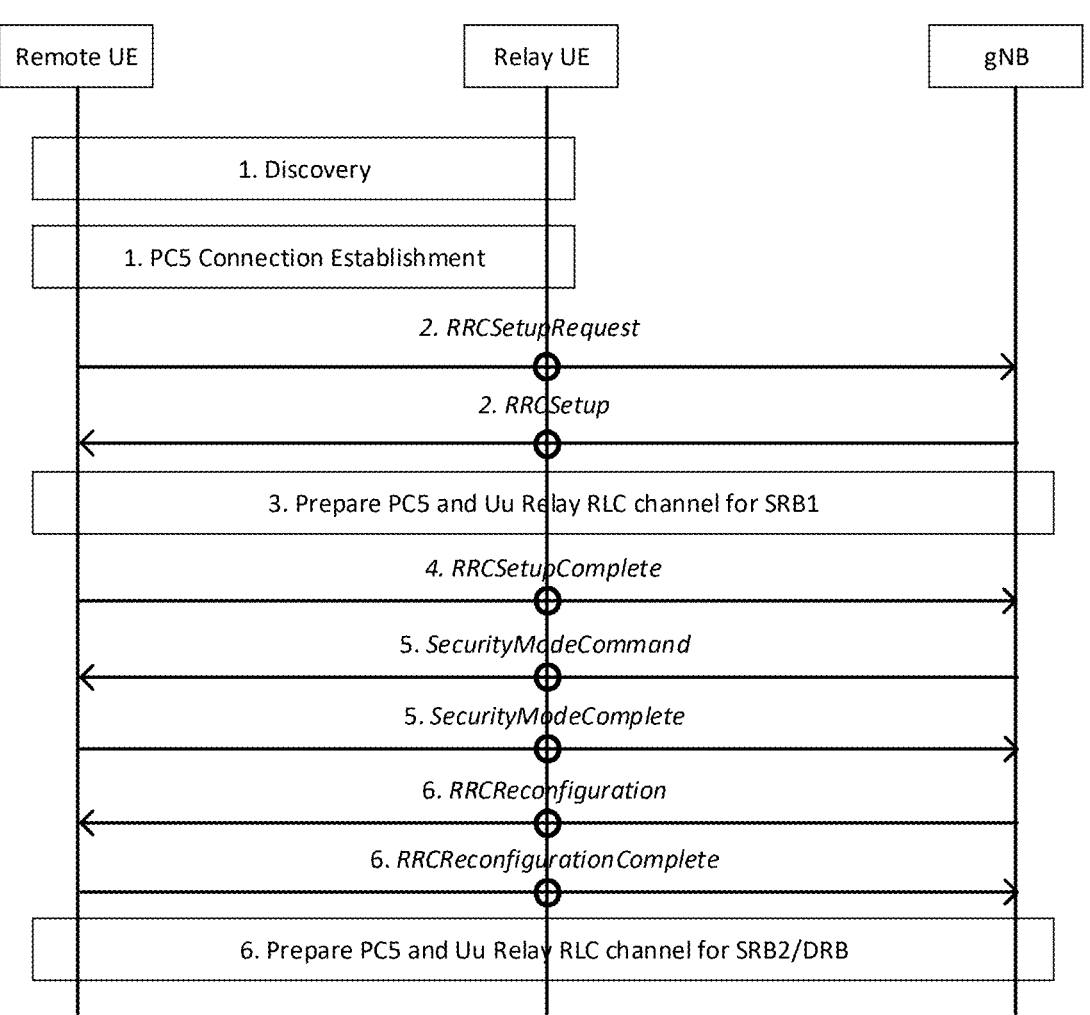
FIG. 7 is a reproduction of FIG. 16.12.5.1-1 of 3GPP 38.300 V18.1.0.

The following high level connection establishment procedure in FIG. 16.12.5.1-1 applies to a L2 U2N Relay and L2 U2N Remote UE:

[FIG. 16.12.5.1-1 of 3GPP 38.300 V18.1.0, Entitled "Procedure for L2 U2N Remote UE Connection Establishment", is Reproduced as FIG. 7]

1. The L2 U2N Remote and L2 U2N Relay UE perform discovery procedure, and establish a PC5-RRC connection using the NR sidelink PC5 unicast link establishment procedure.

2. The L2 U2N Remote UE sends the first RRC message (i.e., RRCSetupRequest) for its connection establishment with gNB via the L2 U2N Relay UE, using a specified PC5 Relay RLC channel configuration. The L2 U2N Relay UE sends the SidelinkUEInformationNR message to request for the dedicated configurations required to support the relay operation for the L2 U2N Remote UE. If the L2 U2N Relay UE is not in RRC_CONNECTED, it needs to do its own Uu RRC connection establishment upon reception of a message on the specified PC5 Relay RLC channel. After L2 U2N Relay UE's RRC connection establishment procedure and sending the SidelinkUEInformationNR message, gNB configures SRB0 relaying Uu Relay RLC channel to the U2N Relay UE. The gNB responds with an RRCSetup message to L2 U2N Remote UE. The RRCSetup message is sent to the L2 U2N Remote UE using SRB0 relaying Uu Relay RLC channel over Uu and a specified PC5 Relay RLC channel over PC5.
NOTE 1: Void.

3. The gNB and L2 U2N Relay UE perform relaying channel setup procedure over Uu. According to the configuration from gNB, the L2 U2N Relay/Remote UE establishes a PC5 Relay RLC channel for relaying of SRB1 towards the L2 U2N Remote/Relay UE over PC5.

4. The RRCSetupComplete message is sent by the L2 U2N Remote UE to the gNB via the L2 U2N Relay UE using SRB1 relaying channel over PC5 and SRB1 relaying channel configured to the L2 U2N Relay UE over Uu. Then the L2 U2N Remote UE is as in RRC_CONNECTED with the gNB.

5. The L2 U2N Remote UE and gNB establish security following the Uu security mode procedure and the security messages are forwarded through the L2 U2N Relay UE.

6. The gNB sends an RRCReconfiguration message to the L2 U2N Remote UE via the L2 U2N Relay UE, to setup the end-to-end SRB2/DRBs of the L2 U2N Remote UE. The L2 U2N Remote UE sends an RRCReconfigurationComplete message to the gNB via the L2 U2N Relay UE as a response. In addition, the gNB may configure additional Uu Relay RLC channels between the gNB and L2 U2N Relay UE, and PC5 Relay RLC channels between L2 U2N Relay UE and L2 U2N Remote UE for the relaying traffic.
. . .
16.12.5.5 System Information The in-coverage L2 U2N Remote UE is allowed to acquire any necessary SIB(s) over Uu interface irrespective of its PC5 connection to L2 U2N Relay UE. The L2 U2N Remote UE can also receive the system information from the L2 U2N Relay UE after PC5 connection establishment with L2 U2N Relay UE.

The L2 U2N Remote UE in RRC_CONNECTED can use the on-demand SIB framework as specified in TS 38.331 [12] to request the SIB(s) via L2 U2N Relay UE. The L2 U2N Remote UE in RRC_IDLE or RRC_INACTIVE can inform L2 U2N Relay UE of its requested SIB type(s) via PC5-RRC message. Then, L2 U2N Relay UE triggers on-demand SI/SIB acquisition procedure as specified in TS 38.331 [12] according to its own RRC state (if needed) and sends the acquired SI(s)/SIB(s) to L2 U2N Remote UE via PC5-RRC message.

Any SIB that the RRC_IDLE or RRC_INACTIVE L2 U2N Remote UE has a requirement to use (e.g., for relay purpose) can be requested by the L2 U2N Remote UE (from the L2 U2N Relay UE or the network). For SIBs that have been requested by the L2 U2N Remote UE from the L2 U2N Relay UE, the L2 U2N Relay UE forwards them again in case of any update for requested SIB(s). In case of RRC-_CONNECTED L2 U2N Remote UE(s), it is the responsibility of the network to send updated SIB(s) to L2 U2N Remote UE(s) when they are updated. The L2 U2N Remote UE de-configures SI request with L2 U2N Relay UE when entering into RRC_CONNECTED state.

For SIB1 forwarding, for L2 U2N Remote UE, both request-based delivery (i.e., SIB1 request by the U2N Remote UE) and unsolicited forwarding are supported by L2 U2N Relay UE, of which the usage is left to L2 U2N Relay UE implementation. If SIB1 changes, for L2 U2N Remote UE in RRC_IDLE or RRC_INACTIVE, the L2 U2N Relay UE always forwards SIB1.

For the L2 U2N Remote UE in RRC_IDLE or RRC_I-NACTIVE, the short message over Uu interface is not forwarded by the L2 U2N Relay UE to the L2 U2N Remote UE. The L2 U2N Relay UE can forward PWS SIBs to its connected L2 U2N Remote UE(s).

RAN sharing is supported for L2 U2N Relay UE. In particular, the L2 U2N Relay UE may forward, via discovery message, cell access related information before the establishment of a PC5-RRC connection.
16.12.5.6 Paging When both L2 U2N Relay UE and L2 U2N Remote UE are in RRC_IDLE or RRC_INACTIVE, the L2 U2N Relay UE monitors paging occasions of its connected L2 U2N Remote UE(s). When a L2 U2N Relay UE needs to monitor paging for a L2 U2N Remote UE, the L2 U2N Relay UE should monitor all POs of the L2 U2N Remote UE.

When L2 U2N Relay UE is in RRC_CONNECTED and L2 U2N Remote UE(s) is in RRC_IDLE or RRC_INAC-TIVE, there are two options for paging delivery:

The L2 U2N Relay UE monitors POs of its connected L2 U2N Remote UE(s) if the active DL BWP of the L2 U2N Relay UE is configured with common search space including paging search space;

The delivery of the L2 U2N Remote UE's paging can be performed through a dedicated RRC message from the gNB to the L2 U2N Relay UE. The dedicated RRC message for delivering L2 U2N Remote UE paging to the RRC_CONNECTED L2 U2N Relay UE may contain one or more Remote UE IDs (5G-S-TMSI or I-RNTI).

It is up to network implementation to decide which of the above two options to use. The L2 U2N Relay UE in RRC_CONNECTED, if configured with paging search space, can determine whether to monitor POs for a L2 U2N Remote UE based on the indication within the PC5-RRC signalling received from the L2 U2N Remote UE.

The L2 U2N Remote UE in RRC_IDLE provides 5G-S-TMSI and UE specific DRX cycle (if configured by upper layer) to the L2 U2N Relay UE for requesting to perform PO monitoring. The L2 U2N Remote UE in RRC_INACTIVE provides the minimum value of two UE specific DRX cycles (if configured respectively by upper layer and NG-RAN), 5G-S-TMSI and I-RNTI to the L2 U2N Relay UE for PO monitoring. The L2 U2N Relay UE in RRC_CONNECTED can notify the L2 U2N Remote UE information (i.e. 5G-S-TMSI/I-RNTI) to the gNB via the SidelinkUEInformationNR message for paging delivery purpose. The L2 U2N Relay UE receives paging messages to check the 5G-S-TMSI/I-RNTI and sends relevant paging record to the L2 U2N Remote UE accordingly.

The L2 U2N Relay UE uses unicast signalling to send paging to the L2 U2N Remote UE via PC5.

3GPP TS 38.331 specifies procedures related to single-hop UE-to-Network (U2N) Relay as follows:

5.3.2 Paging 5.3.2.1 General

Figure 8:
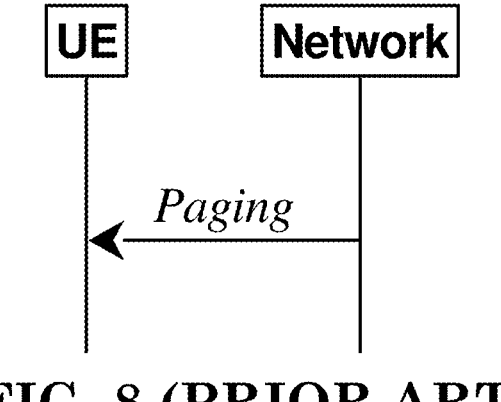
FIG. 8 is a reproduction of FIG. 5.3.2.1-1 of 3GPP TS 38.331 V18.1.0.

[FIG. 5.3.2.1-1 of 3GPP TS 38.331 V18.1.0, Entitled "Paging", is Reproduced as FIG. 8]

The purpose of this procedure is:

to transmit paging information to a UE in RRC_IDLE or RRC_INACTIVE.

to transmit paging information for a L2 U2N Remote UE in RRC_IDLE or RRC_INACTIVE to its serving L2 U2N Relay UE in any RRC state.

5.3.2.2 Initiation

The network initiates the paging procedure by transmitting the Paging message at the UE's paging occasion as specified in TS 38.304 [20]. The network may address multiple UEs within a Paging message by including one PagingRecord for each UE. The network may also include one or multiple TMGI(s) in the Paging message to page UEs for specific MBS multicast session(s).

5.3.2.3 Reception of the Paging Message by the UE or PagingRecord by the L2 U2N Remote UE Upon receiving the Paging message by the UE or receiving PagingRecord from its connected L2 U2N Relay UE by a L2 U2N Remote UE, the UE shall:

1> if in RRC_IDLE, for each of the PagingRecord, if any, included in the Paging message, or
1> if in RRC_IDLE, for the PagingRecord, if any, included in the UuMessageTransferSidelink message received from the connected L2 U2N Relay UE:
  2> if the ue-Identity included in the PagingRecord matches the UE identity allocated by upper layers:
    3> if upper layers indicate the support of paging cause:
      4> forward the ue-Identity, accessType (if present) and paging cause (if determined) to the upper layers;
    3> else:
      4> forward the ue-Identity and accessType (if present) to the upper layers;
NOTE 1: If the L2 U2N Relay UE supports the MUSIM feature, it can forward the paging cause to the connected L2 U2N Remote UE.
1> if in RRC_INACTIVE, for each of the PagingRecord, if any, included in the Paging message, or
1> if in RRC_INACTIVE, for the PagingRecord, if any, included in the UuMessageTransferSidelink message received from the connected L2 U2N Relay UE:
  2> if the ue-Identity included in the PagingRecord matches the UE's stored fullI-RNTI:
    3> if the UE is configured by upper layers with Access Identity 1:
      4> initiate the RRC connection resumption procedure according to 5.3.13 with resumeCause set to mps-PriorityAccess;
    3> else if the UE is configured by upper layers with Access Identity 2:
      4> initiate the RRC connection resumption procedure according to 5.3.13 with resumeCause set to mcs-PriorityAccess;
    3> else if the UE is configured by upper layers with one or more Access Identities equal to 11-15:
      4> initiate the RRC connection resumption procedure according to 5.3.13 with resumeCause set to highPriorityAccess;
    3> else if mt-SDT indication was included in the Paging message and if the conditions for initiating SDT for a resume procedure initiated in response to RAN paging according to 5.3.13.1b are fulfilled:
      4> if pagingGroupList was not included in the Paging message; or:
      4> if pagingGroupList was included in the Paging message but the UE has not joined any MBS session(s) indicated by the TMGI(s) included in the pagingGroupList or:
      4> if pagingGroupList was included in the Paging message, the UE is configured to receive MBS multicast in RRC_INACTIVE, and inactiveReceptionAllowed was included for all the MBS session(s) indicated by the TMGI(s) that the UE has joined:
        5> initiate the RRC connection resumption procedure according to 5.3.13 with resumeCause set to mt-SDT:
      4> else:
        5> initiate the RRC connection resumption procedure according to 5.3.13 with resumeCause set to mt-Access;
    3> else:
      4> initiate the RRC connection resumption procedure according to 5.3.13 with resumeCause set to mt-Access;

-continued

NOTE 2: If both conditions for initiating MT-SDT and MO-SDT according to 5.3.13.1b are
fulfilled, UE may initiate RRC connection resumption procedure for MT-SDT or MO-
SDT based on implementation.
NOTE 3: A MUSIM UE may not initiate the RRC connection resumption procedure, e.g. when
it decides not to respond to the Paging message due to UE implementation
constraints as specified in TS 24.501 [23].
  2> else if the ue-Identity included in the PagingRecord matches the UE identity allocated
  by upper layers:
    3> if upper layers indicate the support of paging cause:
      4> forward the ue-Identity, accessType (if present) and paging cause (if determined)
      to the upper layers;
    3> else:
      4> forward the ue-Identity and accessType (if present) to the upper layers;
    3> perform the actions upon going to RRC_IDLE as specified in 5.3.11 with release
    cause 'other';
1> if in RRC_IDLE, for each TMGI included in pagingGroupList, if any, included in the
Paging message:
  2> if the UE has joined an MBS session indicated by the TMGI included in the
  pagingGroupList:
    3> forward the TMGI to the upper layers;
1> if in RRC_INACTIVE and the UE has joined one or more MBS session(s) indicated by
the TMGI(s) included in the pagingGroupList:
  2> if PagingRecordList is not included in the Paging message; or
  2> if none of the ue-Identity included in any of the PagingRecord matches the UE identity
  allocated by upper layers or the UE's stored fullI-RNTI:
    3> if the UE is not configured to receive multicast in RRC_INACTIVE for at least one of
    the MBS sessions indicated by the TMGI(s) that the UE has joined; or
    3> if inactiveReceptionAllowed is not included for at least one of the MBS sessions
    indicated by the TMGI(s) that the UE has joined:
      4> initiate the RRC connection resumption procedure according to 5.3.13 with
      resumeCause set as below:
        5> if the UE is configured by upper layers with Access Identity 1:
          6> set resumeCause to mps-PriorityAccess;
        5> else if the UE is configured by upper layers with Access Identity 2:
          6> set resumeCause to mcs-PriorityAccess;
        5> else if the UE is configured by upper layers with one or more Access Identities
        equal to 11-15:
          6> set resumeCause to highPriorityAccess;
        5> else:
          6> set resumeCause to mt-Access;
    3> else:
      4> start monitoring the G-RNTI(s), if configured, corresponding to the TMGI(s);
      4> if the UE was notified to stop monitoring the G-RNTI(s) for all the joined
      multicast sessions that are configured for reception in RRC_INACTIVE:
        5> if multicast MCCH is present:
            6> start monitoring the Multicast MCCH-RNTI;
            6> acquire the MBSMulticastConfiguration message on multicast MCCH;
          5> else if the UE selected or re-selected to a cell which is different from the cell
          where the multicast service(s) was received in RRC_CONNECTED:
            6> initiate RRC connection resume procedure for multicast reception as
            specified in 5.3.13.1d;
        4> else if the UE was notified to stop monitoring the G-RNTI for at least one
        multicast session for which the PTM configuration was not included in
        RRCRelease message:
          5> acquire the MBSMulticastConfiguration message on multicast MCCH;
  2> else if the ue-Identity included in any of the PagingRecord matches the UE identity
  allocated by upper layers:
    3> forward the TMGI(s) to the upper layers;
1> if the UE is acting as a L2 U2N Relay UE, for each of the PagingRecord, if any, included
in the Paging message:
  2> if the ue-Identity included in the PagingRecord in the Paging message matches the UE
  identity in sl-PagingIdentityRemoteUE included in sl-PagingInfo-RemoteUE received in
  RemoteUEInformationSidelink message from a L2 U2N Remote UE:
    3> inititate the Uu Message transfer in sidelink to that UE as specified in 5.8.9.9;
[...]

5.8.9.8 Remote UE information 5.8.9.8.1 General

Figure 9:
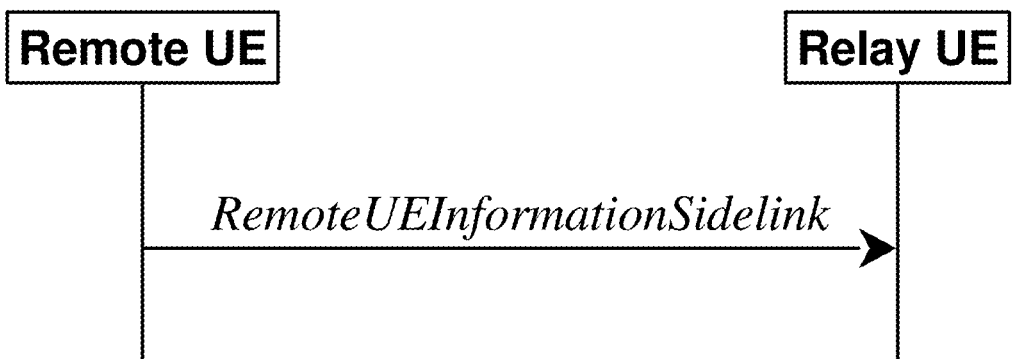
FIG. 9 is a reproduction of FIG. 5.8.9.8.1-1 of 3GPP TS 38.331 V18.1.0.

[FIG. 5.8.9.8.1-1 of 3GPP TS 38.331 V18.1.0, Entitled "Remote UE Information", is Reproduced as FIG. 9]

This procedure is used by the L2 U2N Remote UE in RRC_IDLE/RRC_INACTIVE to inform about the required SIB(s)/posSIB(s), provide Paging related information to the connected L2 U2N Relay UE, request the SFN-DFN offset from the connected L2 U2N Relay UE, and trigger L2 U2N Relay UE in RRC_IDLE/RRC_INACTIVE to enter RRC_CONNECTED during indirect path addition/change in MP operation. This procedure is also used by the L2 U2U Remote UE to send end-to-end PC5 connection release/failure related information to L2 U2U Relay UE. This procedure is used by the L2 U2N Remote UE in RRC_CONNECTED to request the SFN-DFN offset from the connected L2 U2N Relay UE.

NOTE: MIB is not required by a L2 U2N Remote UE.

5.8.9.8.2 Actions Related to Transmission of RemoteUEInformationSidelink Message When entering RRC_IDLE or RRC_INACTIVE, or upon change in any of the information in the RemoteUEInformationSidelink while in RRC_IDLE or RRC_INACTIVE, the L2 U2N Remote UE shall:

1> if the UE has SIB request information to provide (e.g. the UE has not stored a valid version of a SIB, in accordance with clause 5.2.2.2.1, of one or several required SIB(s) in accordance with clause 5.2.2.1 and the requested SIB has not been indicated in RemoteUEInformationSidelink message to the L2 U2N Relay UE before):

2> include sI-RequestedSIB-List in the RemoteUEInformationSidelink to indicate the requested SIB(s);

1> if the UE has not stored a valid version, in accordance with clause 5.2.2.2.1, of one or several posSIB(s) that the UE requires for a positioning operation, and the requested posSIB has not been indicated in RemoteUEInformationSidelink message to the L2 U2N Relay UE before, and the connected L2 U2N relay UE set posSIB-ForwardingSupported to supported:

2> include sI-RequestedPosSIB-List in the RemoteUEInformationSidelink to indicate the requested posSIB(s);

1> if the UE needs the SFN-DFN offset based on the request from upper layers and the connected L2 U2N relay UE set sfn-DFN-OffsetSupported to supported:

2> set sI-SFN-DFN-OffsetRequested to true;

1> if the UE has paging related information to provide (e.g. the UE has not sent sI-PagingInfo-RemoteUE in the RemoteUEInformationSidelink message to the L2 U2N Relay UE before), set sI-PagingInfo-RemoteUE as follows:

2> if the L2 U2N Remote UE is in RRC_IDLE:

3> include ng-5G-S-TMSI in the sI-PagingIdentityRemoteUE;

3> if the UE specific DRX cycle is configured by upper layer, set sI-PagingCycleRemoteUE to the value of UE specific Uu DRX cycle configured by upper layer;

2> else if the L2 U2N Remote UE is in RRC_INACTIVE:

3> include ng-5G-S-TMSI and fulll-RNTI in the sI-PagingIdentityRemoteUE;

3> if the UE specific DRX cycle is configured by upper layer,

4> set sI-PagingCycleRemoteUE to the minimum value of UE specific Uu DRX cycles (configured by upper layer and configured by RRC);

3> else:

4> set sI-PagingCycleRemoteUE to the value of UE specific DRX cycle configured by RRC;

1> submit the RemoteUEInformationSidelink message to lower layers for transmission;

When entering RRC_CONNECTED, if L2 U2N remote UE had sent sI-RequestedSIB-List, sI-RequestedPosSIB-List, and/or sI-PagingInfo-RemoteUE, the L2 U2N Remote UE shall:

1> set the sI-RequestedSIB-List to the value release if requested before;

1> set the sI-RequestedPosSIB-List to the value release if requested before;

1> set the sI-PagingInfo-RemoteUE to the value release if sent before;

1> submit the RemoteUEInformationSidelink message to lower layers for transmission;

Upon any change in the need of SFN-DFN offset while in RRC_CONNECTED, the L2 U2N Remote UE shall:

1> if the UE needs the SFN-DFN offset based on the request from upper layers and the connected L2 U2N relay UE set sfn-DFN-OffsetSupported to supported:

2> set sI-SFN-DFN-OffsetRequested to true;

1> submit the RemoteUEInformationSidelink message to lower layers for transmission;

The L2 U2N Remote UE in RRC_CONNECTED shall:

1> if the UE is configured with sI-IndirectPathAddChange set to setup, and not configured with split SRB1 with duplication:

2> include connectionForMP;

2> submit the RemoteUEInformationSidelink message to lower layers for transmission;

[ . . .]

5.8.9.8.3 Reception of RemoteUEInformationSidelink Message by the L2 U2N/U2U Relay UE The L2 U2N Relay UE shall:

---

1> if the RemoteUEInformationSidelink includes the sI-PagingInfo-RemoteUE:
  2> if the UE is in RRC_CONNECTED on an active BWP with common search space configured including pagingSearchSpace; or
  2> if the UE is in RRC_IDLE or RRC_INACTIVE:
    3> if the sI-PagingInfo-RemoteUE is set to setup:
      4> monitor the Paging message at the L2 U2N Remote UE's paging occasion calculated according to sI-PagingIdentityRemoteUE and sI-PagingCycleRemoteUE included in sI-PagingInfo-RemoteUE;
    3> else (the sI-PagingInfo-RemoteUE is set to release):
      4> stop monitoring the Paging message at the L2 U2N Remote UE's paging occasion;
      4> release the received paging information in sI-PagingInfo-RemoteUE;
  2> else (the UE is in RRC_CONNECTED on an active BWP without pagingSearchSpace configured):
    3> if the sI-PagingInfo-RemoteUE is set to setup:
      4> include the received sI-PagingIdentityRemoteUE in SidelinkUEInformationNR message and perform Sidelink UE information transmission in accordance with 5.8.3;
    3> else (the sI-PagingInfo-RemoteUE is set to release):
      4> initiate transmission of the SidelinkUEInformationNR message to release the sI-PagingIdentityRemoteUE in SidelinkUEInformationNR message in accordance with 5.8.3;
      4> release the received paging information in sI-PagingInfo-RemoteUE;
1> if the RemoteUEInformationSidelink includes the sI-RequestedSIB-List:
  2> if the sI-RequestedSIB-List is set to setup:
    3> if the L2 U2N Relay UE has not stored a valid version of SIB(s) indicated in sI-RequestedSIB-List:
      4> perform acquisition of the system information indicated in sI-RequestedSIB-List in accordance with 5.2.2;
    3> perform the Uu message transfer procedure in accordance with 5.8.9.9;
  2> if the sI-RequestedSIB-List is set to release:
    3> release received SIB request in sI-RequestedSIB-List;
1> if the RemoteUEInformationSidelink includes the sI-RequestedPosSIB-List:
  2> if the sI-RequestedPosSIB-List is set to setup:
    3> if the L2 U2N Relay UE has not stored a valid version of posSIB(s) indicated in sI-RequestedPosSIB-List:
      4> perform acquisition of the positioning system information indicated in sI-RequestedPosSIB-List in accordance with 5.2.2;
    3> perform the Uu message transfer procedure in accordance with 5.8.9.9;
  2> if the sI-RequestedPosSIB-List is set to release:
    3> release received posSIB request in sI-RequestedPosSIB-List.
1> if the RemoteUEInformationSidelink includes the connectionForMP:
  2> if the L2 U2N Relay UE is in RRC_IDLE:
    3> initiate an RRC connection establishment as specified in 5.3.3;
  2> else if the L2 U2N Relay UE is in RRC_INACTIVE:
    3> initiate an RRC connection resume as specified in 5.3.13;
[. . .]

---

5.8.9.9 Uu Message Transfer in Sidelink 5.8.9.9.1 General

Figure 10:
FIG. 10 is a reproduction of FIG. 5.8.9.9.1-1 of 3GPP TS 38.331 V18.1.0.

[FIG. 5.8.9.9.1-1 of 3GPP TS 38.331 V18.1.0, Entitled "Uu Message Transfer in Sidelink", is Reproduced as FIG. 10]

The purpose of this procedure is to transfer Paging message and System Information from the L2 U2N Relay UE to the L2 U2N Remote UE in RRC_IDLE/RRC_INACTIVE.

5.8.9.9.2 Actions Related to Transmission of UuMessageTransferSidelink Message

The L2 U2N Relay UE initiates the Uu message transfer procedure when at least one of the following conditions is met:

1> upon receiving Paging message related to the connected L2 U2N Remote UE from network (including Paging message within RRCReconfiguration message);
  1> upon acquisition of the SIB(s) requested by the connected L2 U2N Remote UE (as indicated in sl-RequestedSIB-List in the RemoteUEInformationSidelink) or upon receiving the updated SIB(s) from network which has been requested by the connected L2 U2N Remote UE;
  1> upon acquisition of the posSIB(s) requested by the connected L2 U2N Remote UE (as indicated in sl-RequestedPosSIB-List in the RemoteUEInformationSidelink) or upon receiving the updated posSIB(s) from network which have been requested by the connected L2 U2N Remote UE;
  1> upon unsolicited SIB1 forwarding to the connected L2 U2N Remote UE or upon receiving the updated SIB1 from network;

For each associated L2 U2N Remote UE, the L2 U2N Relay UE shall set the contents of UuMessageTransferSidelink message as follows:

1> include sl-PagingDelivery if the Paging message received from network containing the ue-Identity of the L2 U2N Remote UE;
  1> include sl-SIB1-Delivery if any of the conditions for initiating Uu message transfer procedure related to SIB1 are met;
  1> include sl-SystemInformationDelivery if any of the conditions for initiating Uu message transfer procedure related to System Information are met;
  1> submit the UuMessageTransferSidelink message to lower layers for transmission.

NOTE: The L2 U2N Relay UE may perform unsolicited forwarding of SIB1 to the L2 U2N Remote UE based on UE implementation.

5.8.9.9.3 Reception of the UuMessageTransferSidelink

Upon receiving the UuMessageTransferSidelink message, the L2 U2N Remote UE shall:

1> if sl-PagingDelivery is included:

2> perform the paging reception procedure as specified in clause 5.3.2.3;

1> if sl-SystemInformationDelivery and/or sl-SIB1-Delivery is included:

2> perform the actions specified in clause 5.2.2.4.

[ . . . ]

6.6.2 Message Definitions

[ . . . ]

RemoteUEInformationSidelink

The RemoteUEInformationSidelink message is used to request SIB(s) or provide paging related information, or provide other remote UE information, as specified in clause 5.8.9.8.1.

[ . . . ]

---

RemoteUEInformationSidelink message

```
-- ASN1START
-- TAG-REMOTEUEINFORMATIONSIDELINK-START
RemoteUEInformationSidelink-r17 ::=                SEQUENCE {
    criticalExtensions                                CHOICE {
        remoteUEInformationSidelink-r17                   RemoteUEInformationSidelink-r17-IEs,
        criticalExtensionsFuture                          SEQUENCE { }
    }
}
RemoteUEInformationSidelink-r17-IEs ::=            SEQUENCE {
    sl-RequestedSIB-List-r17                          SetupRelease { SL-RequestedSIB-List-r17}
OPTIONAL, -- Need M
    sl-PagingInfo-RemoteUE-r17                        SetupRelease { SL-PagingInfo-RemoteUE-r17}
OPTIONAL, -- Need M
    lateNonCriticalExtension                          OCTET STRING
OPTIONAL,
    nonCriticalExtension                              RemoteUEInformationSidelink-v1800-IEs
OPTIONAL
}
RemoteUEInformationSidelink-v1800-IEs ::=          SEQUENCE {
    sl-RequestedPosSIB-List-r18                       SetupRelease { SL-RequestedPosSIB-List-r18 }
OPTIONAL, -- Need M
    sl-SFN-DEN-OffsetRequested-r18                    ENUMERATED { true }
OPTIONAL, -- Need R
    connectionForMP-r18                               ENUMERATED { true}
OPTIONAL, -- Need N
    sl-DestinationIdentityRemoteUE-r18                SL-DestinationIdentity-r16
OPTIONAL, -- Need N
    nonCriticalExtension                              SEQUENCE { }
OPTIONAL
}
SL-RequestedSIB-List-r17 ::=                       SEQUENCE (SIZE (maxSIB-MessagePlus1-r17) ) OF SL-SIB-
ReqInfo-r17
SL-PagingInfo-RemoteUE-r17 ::=                     SEQUENCE {
    sl-PagingIdentityRemoteUE-r17                     SL-PagingIdentityRemoteUE-r17,
    sl-PagingCycleRemoteUE-r17                        PagingCycle
OPTIONAL -- Need M
}
SL-SIB-ReqInfo-r17 ::=            ENUMERATED { sib1, sib2, sib3, sib4, sib5, sib6, sib7,
sib8, sib9, sib10, sib11, sib12, sib13,
                                                  sib14, sib15, sib16, sib17, sib18, sib19,
sib20, sib21, sibNotReq11, sibNotReq10, sibNotReq9,
                                                  sibNotReq8, sibNotReq7, sibNotReq6,
sibNotReq5, sibNotReq4, sibNotReq3, sibNotReq2, sibNotReq1, . . . }
SL-RequestedPosSIB-List-r18 ::=                   SEQUENCE (SIZE (1..maxSIB) ) OF SL-PosSIB-ReqInfo-r18
SL-PosSIB-ReqInfo-r18 ::=                          SEQUENCE {
    gnss-id-r18                                          GNSS-ID-r16
OPTIONAL, -- Need R
    sbas-id-r18                                          SBAS-ID-r16
OPTIONAL, -- Cond GNSS-ID-SBAS
    posSibType-r18                  ENUMERATED { possibType1-1, possibType1-2, possibType1-3,
possSibType1-4, possSibType1-5, possSibType1-6,
                                                  possSibType1-7, possSibType1-8, possSibType1-9,
possSibType1-10, possSibType1-11,
                                                  possSibType1-12, possSibType2-1, possSibType2-2,
possSibType2-3, possSibType2-4, possSibType2-5,
                                                  possSibType2-6, possSibType2-7, possSibType2-8,
possSibType2-9, possSibType2-10, possSibType2-11,
```

-continued

| RemoteUEInformationSidelink message |
|---|
| posSibType2-15, posSibType2-16,<br><br>posSibType2-19, posSibType2-20,<br><br>posSibType2-23, posSibType2-24,<br><br>posSibType3-1, posSibType4-1,<br><br>posSibType6-3, posSibType6-4, posSibType6-5,<br><br>posSibType7-2, posSibType7-3, posSibType7-4,<br><br>}<br>-- TAG-REMOTEUEINFORMATIONSIDELINK-STOP<br>-- ASN1STOP | posSibType2-12, posSibType2-13, posSibType2-14,<br><br>posSibType2-17, posSibType2-18, posSibType2-18a,<br><br>posSibType2-20a, posSibType2-21, posSibType2-22,<br><br>posSibType2-25, posSibType2-26, posSibType2-27,<br><br>posSibType5-1, posSibType6-1, posSibType6-2,<br><br>posSibType6-6, posSibType6-7, posSibType7-1,<br><br>. . . } |

| RemoteUEInformationSidelink-IEs field descriptions |
|---|
| connectionForMP<br>Indicates the connected L2 U2N Relay UE by the L2 U2N Remote UE that the access is for MP.<br>sl-DestinationIdentityRemoteUE-r18<br>Indicates the peer L2 U2U Remote UE upon end-to-end PC5 connection failure or release.<br>sl-PagingCycleRemoteUE<br>Indicates the L2 U2N Remote UE's UE specific DRX cycle as the minimum value of the one<br>provided by upper layers (if configured) and the one provided by RRC layer (if configured). Value<br>rf32 corresponds to 32 radio frames, value rf64 corresponds to 64 radio frames and so on.<br>sl-PagingIdentityRemoteUE<br>Indicates the L2 U2N Remote UE's paging UE ID.<br>sl-PagingInfo-RemoteUE<br>Indicates the paging information used by L2 U2N Relay UE to perform the connected L2 U2N<br>Remote UE's paging monitoring.<br>sl-RequestedPosSIB-List<br>Contains a list of requested PosSIBs.<br>sl-RequestedSIB-List<br>Contains a list of requested SIBs.<br>sl-SFN-DFN-OffsetRequested<br>If present, this field indicates that the L2 U2N Remote UE requests the L2 U2N Relay UE to<br>provide the SFN-DFN offset in a subsequent RRCReconfigurationSidelink message.<br>SL-SIB-ReqInfo<br>Indicates the requested SIB type. Values sibNotReq11, sibNotReq10, ..., sibNotReq1 shall be<br>ignored by L2 U2N relay UE (i.e., no SIB requested). |

3GPP R2-2407295 discusses control plane procedures on system information and paging delivery for multi-hop relay as follows:

2.7 System Information

In ReL-17, the RRC_CONNECTED Remote UE can use the on-demand SIB framework to request the SIB(s). The RRC_IDLE or RRC_INACTIVE Remote UE can indicate the requested SIB type(s) to the Relay UE, then Relay UE can trigger the on-demand SIB acquisition procedure on the Uu and forward the acquired SIB(s) to the Remote UE via PC5.

In Rel-19 multi-hop relay, the Rel-17 on-demand SIB framework can be reused but with some enhancements for the RRC_IDLE or RRC_INACTIVE Remote UE cases. First, the RRC_IDLE or RRC_INACTIVE Remote UE indicates the required SIB(s) to the Intermediate Relay UE. If the Intermediate Relay UE is also in RRC_IDLE or RRC_INACTIVE and has no required SIB(s), the Relay UE needs to send the request to the U2N Relay UE, e.g., via the PC5 message. It means that the PC5 message form the Intermediate Relay UE to the U2N Relay UE should indicate all the required SIB(s) requested from all the connected Remote UE(s) and the Intermediate Relay UE itself.

Proposal 14: The PC5 message from the Intermediate Relay UE to the U2N Relay UE should indicate all the required SIB(s) requested from all the connected Remote UE(s) and the Intermediate Relay UE itself.

2.8 Paging Delivery

In ReL-17, the RRC_IDLE or RRC_INACTIVE Remote UE provides the Remote UE ID (5G-S-TMSI or I-RNTI) to the relay UE, then the U2N relay UE will forwards the paging to the Remote UE if the paging message contains the Remote UE ID.

In Rel-19 multi-hop relay, the U2N Relay UE need to help forward the paging for the Remote UE and the Intermediate Relay UE if they are both in RRC_IDLE or RRC_INAC-TIVE state. Therefore, in addition to the 5G-S-TMSI or I-RNTI of the Intermediate Relay UE, the Intermediate Relay UE needs to forward the Remote UE IDs to the U2N relay UE.

Proposal 15: The Intermediate Relay UE needs to forward the Remote UE IDs to the U2N relay UE for paging delivery to the Remote UE.

Email discussion on control plane baseline solution for Layer-2 (L2) UE-to-Network (U2N) Relay conducted after 3GPP RAN2 #128 meeting (as included and shown in R2-xxxxxxx Report of [POST128][401][Relay] Control_Plane_v0_Rapp) intends to develop the baseline control plane procedures for connection establishment, and paging/system information forwarding, towards a stage 3 development stage. This document discusses the events that triggers the intermediate relay UE to send SI request or Paging related information from a remote UE or its child relay in PC5-RRC (e.g., in RemoteUEInformationSidelink) to its parent relay (an intermediate relay or the last relay) as follows:

2.2 System Information

In Rel17, a L2 remote UE can obtain system information from its U2N relay UE or directly from the network. In RRC_CONNECTED, the remote UE uses the legacy Uu RRC signaling to obtain the SI directly from the cell, seeing that the Uu RRC signaling can be forwarded transparently by the relay UE. When the remote UE is in RRC_IDLE/RRC_INACTIVE, PC5-RRC is used for the remote UE to request SI from the U2N relay UE (using the RemoteUEInformationSidelink message) and for the U2N relay to provide the SI to the remote UE (using the UuMessageTransferSidelink). The SI request mechanism for the remote UE on PC5-RRC involves:

The remote UE sends its required SI in RemoteUEInformationSidelink to the U2N relay UE when the remote UE transitions to RRC_IDLE/RRC_INACTIVE, or when there is a change in the required SI.

When the remote UE moves to RRC_CONNECTED, it sends RemoteUEInformationSidelink to release the required SI at the relay.

The U2N relay UE will send to a remote UE, any required SI for that remote UE (e.g., when there is a change in such SI)

In RAN2 #128, it was agreed that the SI of the remote UE is provided by forwarding over each of the intermediate UEs.

Agreement:
In multi-hop, the U2N Remote UE acquires the SI of the cell of the Last Relay UE,
   which is forwarded via the Intermediate Relay UE(s). FFS how to perform the forwarding and whether an intermediate relay UE can forward available SI directly (rather than retrieving it from the last relay UE).

[ ... ]

The triggers for sending an SI request via PC5-RRC for the remote UE should at least be supported by the intermediate relay UE since it can itself behave as a remote UE and should request its own SI. In addition, new triggers specific to an intermediate UE may need to be introduced.

Question 2.8: What Triggers the Intermediate Relay UE to Send SI Request in PC5-RRC (e.g., in RemoteUEInformationSidelink) to the Parent Relay (Intermediate Relay or Last Relay)?

a) when there is a change in the SI required by the intermediate UE b) when the intermediate UE enters RRC_IDLE/RRC_INACTIVE c) when the intermediate UE enters RRC_CONNECTED (to cancel a previously sent SI request)

d) upon reception of new/changed required SI received from a remote UE/child relay UE?

e) change in the ability of the intermediate UE to receive SIB broadcast on Uu (e.g., moving in/out of coverage) to initiate/cancel SI forwarding by the parent relay.

f) Others

[ ... ]

2.3 Paging

Paging in Rel17 works in a similar way to system information in that the remote UE sends some information to the relay UE that is required by the relay UE to perform monitoring by the relay UE on behalf of the remote UE. In this case, the information consists of the paging information (paging ID and paging cycle). If the relay UE receives paging for the attached remote UE, the relay UE sends a paging record to the remote UE. Similar to system information, it would be expected that the remote UE and last relay UE behaviour should mimic Rel17.

[ ... ]

Question 3.8: What Triggers the Intermediate Relay UE to Request Paging Monitoring by the Parent Relay (Intermediate Relay or Last Relay) in PC5-RRC (e.g., in RemoteUEInformationSidelink)?

a) when there is a change in the paging information of the intermediate UE b) when the intermediate UE enters RRC_IDLE/RRC_INACTIVE c) when the intermediate UE enters RRC_CONNECTED (to cancel paging monitoring request)

d) upon reception of paging monitoring request from a remote UE/child relay UE?

e) change in the ability of the intermediate UE to monitor paging on Uu (e.g., moving in/out of coverage) to initiate/cancel paging monitoring by the parent relay.

f) Others

[ ... ]

Single-hop UE-to-Network (U2N) Relay was specified in Release 18, as discussed in 3GPP TS 38.300. For single-hop U2N Relay, a U2N relay may be used to support data communication between a remote UE and the network in case the remote UE cannot communicate with the network directly or the remote UE is not within coverage of the network. A U2N relay needs to establish a PC5 connection (or a PC5 unicast link) with the remote UE over the PC5 interface and establish a RRC connection with a network node (e.g. a gNB) over the Uu interface to support data communication between the remote UE and the network via the U2N relay.

Figure 11:
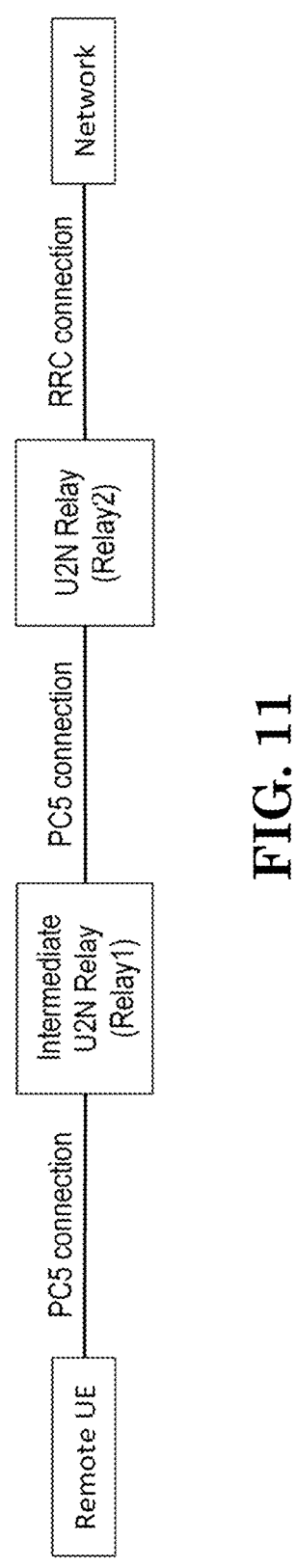
FIG. 11 illustrates an exemplary 2-hop U2N Relay according to one exemplary embodiment.

According to 3GPP TR 23.700-03, multi-hop U2N Relay will be supported in Release 19. Section 6.1 of 3GPP TR 23.700-03 proposes a solution for multi-hop U2N Relay. A 5G ProSe Remote UE (or a L2 U2N Remote UE) may communicate with the network via one 5G ProSe U2N Relay (or one L2 U2N Relay UE) and at least one Intermediate U2N Relay. FIG. 11 illustrates examples of 2-hop U2N Relay, where one PC5 connection is established between the Remote UE and an Intermediate U2N Relay (Relay1) as well as between the Intermediate U2N Relay (Relay1) and the 5G ProSe U2N Relay (Relay2). Before forming multi-hop U2N Relay operation, the Intermediate U2N Relay may act as a Remote UE and establish a RRC connection with the gNB via the 5G ProSe U2N Relay for single-hop U2N Relay operation. Later, another Remote UE may establish a RRC connection with the gNB via the Intermediate U2N Relay and the 5G ProSe U2N Relay for multi-hop U2N Relay operation.

In single-hop U2N Relay operation (as specified in 3GPP TS 38.331), a L2 U2N Remote UE in RRC_IDLE/RRC_INACTIVE may inform about the required SIB(s)/posSIB(s) or provide Paging related information to the connected L2 U2N Relay UE via a RemoteUEInformationSidelink message. In response to reception of the SIB/Paging request, the connected L2 U2N Relay UE may acquire the required SIB(s)/posSIB(s) or monitor the paging message for the Remote UE. Then, the connected L2 U2N Relay UE may send the acquired SIB(s)/posSIB(s) or the received Paging record to the Remote UE via a UuMessageTransferSidelink message. When entering RRC_CONNECTED, the L2 U2N Remote UE shall inform about release of the SIB/Paging request to the connected L2 U2N Relay UE so that the connected L2 U2N Relay UE can stop acquiring the required SIB(s)/posSIB(s) or monitoring the paging message for the Remote UE.

According to 3GPP R2-2407295, in case of multi-hop U2N Relay operation, when receiving a RemoteUEInformationSidelink message, which indicates the SIB/Paging request, from the Remote UE, the Intermediate U2N Relay UE is supposed to forward the SIB/Paging request of the Remote UE to the L2 U2N Relay UE. Then, when receiving a UuMessageTransferSidelink message, which includes the required SIB(s) or the paging record of the Remote UE, from the L2 U2N Relay UE, the Intermediate U2N Relay UE may forward the required SIB(s) or the paging record to the Remote UE.

Email discussion in R2-xxxxxxx Report of [POST128] [401][Relay] Control_Plane_v0_Rapp raises the following events that may trigger the intermediate relay UE to send paging information received from a remote UE or its child relay in a PC5-RRC message (e.g., in RemoteUEInformationSidelink) to its parent relay (an intermediate relay or the last relay):

a) when there is a change in the paging information of the intermediate UE b) when the intermediate UE enters RRC_IDLE/RRC_INACTIVE c) when the intermediate UE enters RRC_CONNECTED (to cancel paging monitoring request)

d) upon reception of paging monitoring request from a remote UE/child relay UE?

e) change in the ability of the intermediate UE to monitor paging on Uu (e.g., moving in/out of coverage) to initiate/cancel paging monitoring by the parent relay.

Basically, after establishing a first PC5 connection with a Remote UE and a second PC5 connection with a last U2N Relay UE for supporting the Remote UE to connect with the network, the Intermediate U2N Relay UE may receive paging information from the Remote UE. Then, the Intermediate U2N Relay UE forwards the paging information to the last U2N Relay UE so that the last U2N Relay UE can monitor the Paging message for the Remote UE. During 2-hop U2N Relay operation, mobility of the Remote UE (e.g. moving away from the Intermediate U2N Relay UE) may cause radio link failure to the PC5 connection between the Remote UE and the Intermediate U2N Relay UE. In this situation, the Intermediate U2N Relay UE may also need to send the PC5-RRC message (e.g. RemoteUEInformationSidelink) to indicate paging information release associated with the Remote UE so that the last U2N Relay UE can release the paging information associated with the Remote UE. Then, the last U2N Relay UE may stop monitoring the Paging message for the Remote UE.

In case of U2N Relay operation with more hops, radio link failure may occur to the PC5 connection between an Intermediate U2N Relay UE and its child Intermediate U2N Relay UE. In this situation, the Intermediate U2N Relay UE may send the PC5-RRC message (e.g. RemoteUEInformationSidelink) to its parent U2N Relay UE (either another Intermediate U2N Relay UE or the last U2N Relay UE) to indicate paging information release associated with all Remote UEs connecting to the network via this Intermediate U2N Relay UE so that the last U2N Relay UE can release all paging information associated with these Remote UEs.

Figure 12:
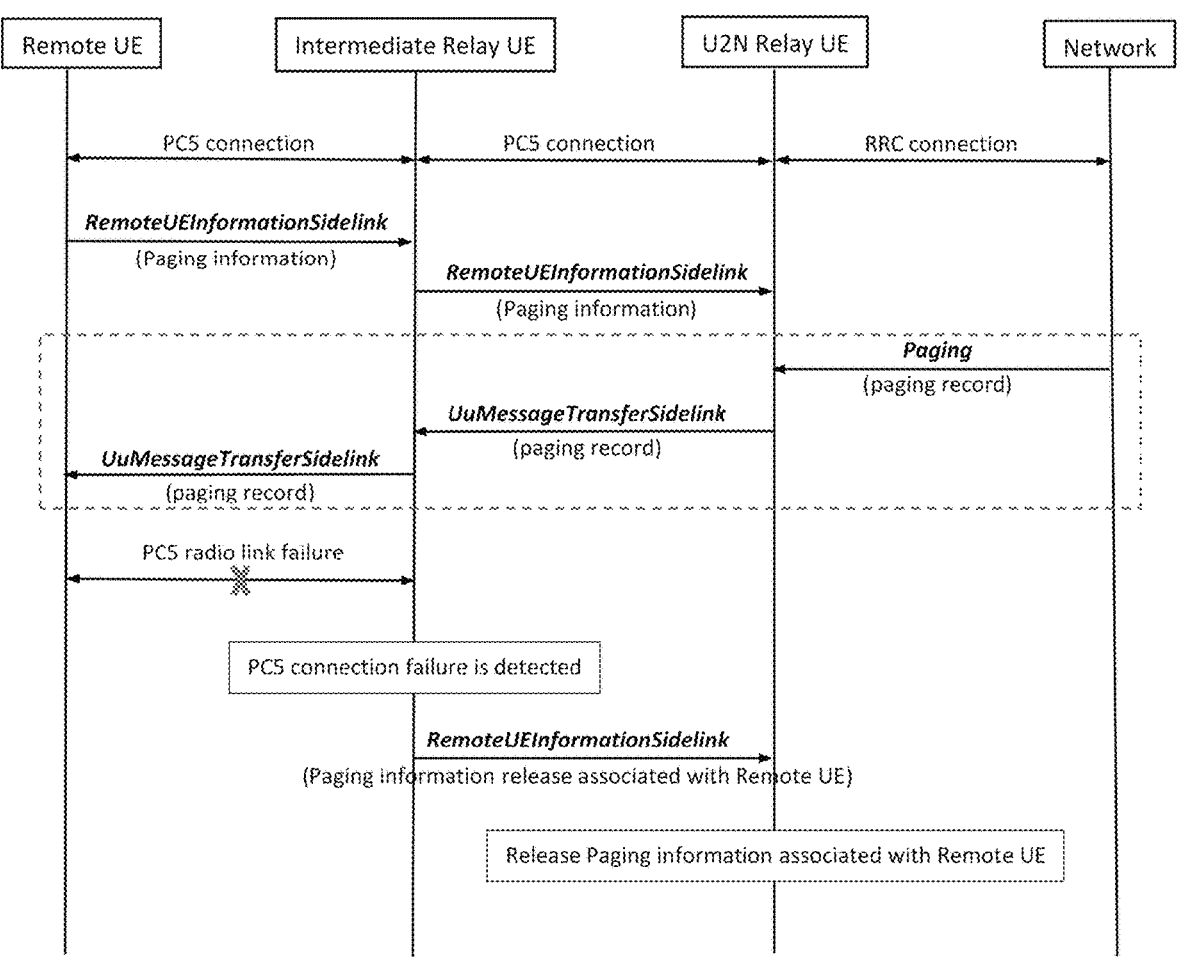
FIG. 12 illustrates an exemplary solution of paging information delivery and release for 2-hop U2N Relay according to one exemplary embodiment.

In one embodiment, a first RemoteUEInformationSidelink message used by the Intermediate U2N Relay UE to send the paging information to the last Relay UE may also include an identity (ID) of the Remote UE (e.g. a local ID or a Layer-2 ID of the Remote UE). In addition, the paging information release may be indicated by setting a sl-PagingInfo-RemoteUE to a value of "release" and a second RemoteUEInformationSidelink message used by the Intermediate U2N Relay UE to send the paging information release to the last Relay UE may also include the ID of the Remote UE. FIG. 12 illustrates an example of the above solution for 2-hop U2N Relay operation.

It is noted that the above mechanisms of paging information release may also be applicable to the event when the PC5 connection (or PC5 unicast link) between an Intermediate U2N Relay UE and the Remote UE or its child Intermediate U2N Relay UE is released.

Figure 13:
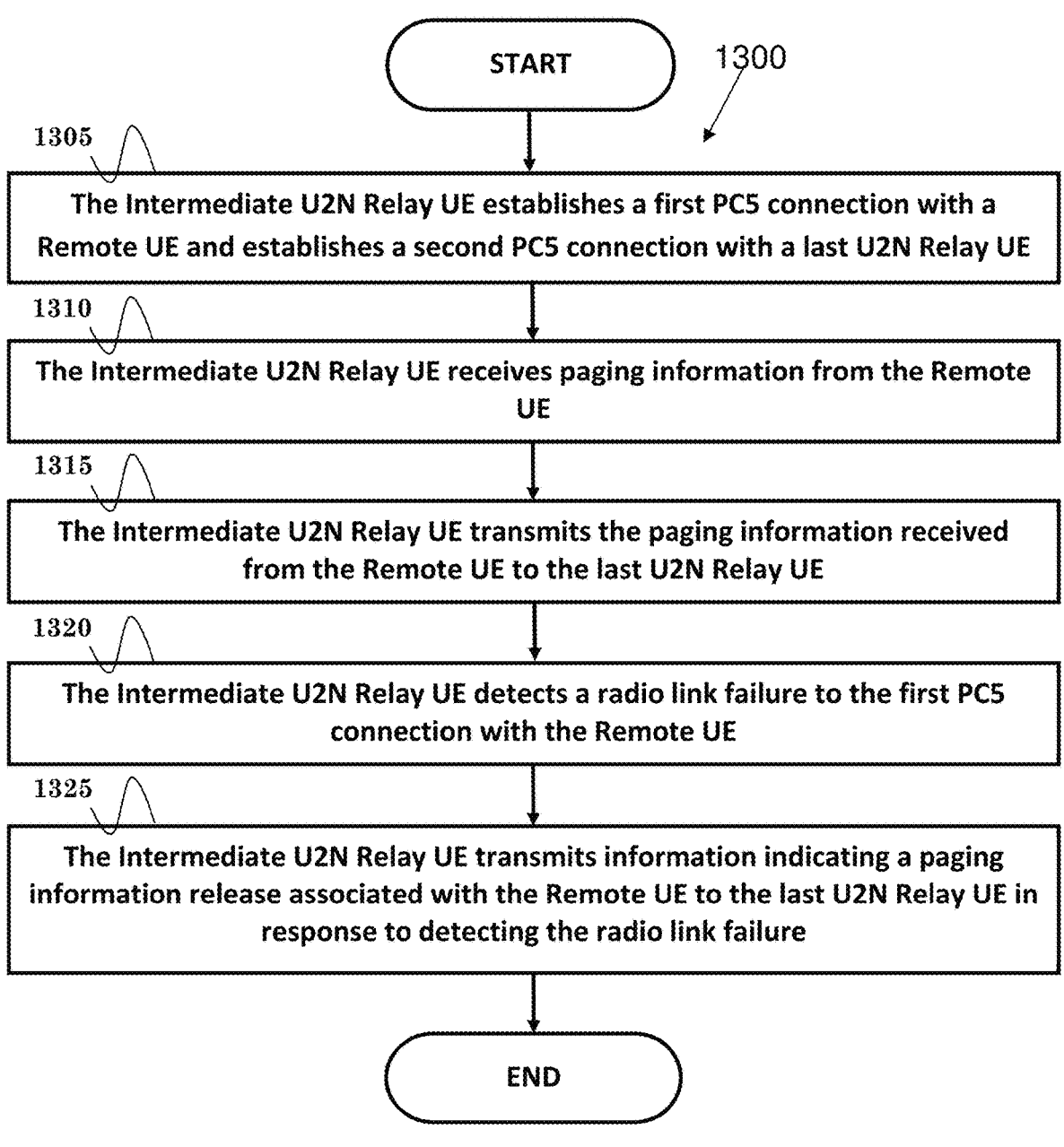
FIG. 13 is a flow chart according to one exemplary embodiment.

FIG. 13 is a flow chart 1300 for an Intermediate UE-to-Network (U2N) Relay User Equipment (UE). In step 1305, the Intermediate U2N Relay UE establishes a first PC5 connection with a Remote UE and establishes a second PC5 connection with a last U2N Relay UE. In step 1310, the Intermediate U2N Relay UE receives paging information from the Remote UE. In step 1315, the Intermediate U2N Relay UE transmits the paging information received from the Remote UE to the last U2N Relay UE. In step 1320, the Intermediate U2N Relay UE detects a radio link failure to the first PC5 connection with the Remote UE. In step 1325, the Intermediate U2N Relay UE transmits information indicating a paging information release associated with the Remote UE to the last U2N Relay UE in response to detecting the radio link failure.

In one embodiment, the paging information could be a first sl-PagingInfo-RemoteUE. The first sl-PagingInfo-RemoteUE may include a sl-PagingIdentityRemoteUE and a sl-PagingCycleRemoteUE.

In one embodiment, the paging information could be sent to the last U2N Relay UE is included in a first RemoteUEInformationSidelink message. The first RemoteUEInformationSidelink message may further include an identity (ID) of the Remote UE. The ID of the Remote UE could be a local ID or a Layer-2 ID of the Remote UE.

In one embodiment, the paging information release could be indicated by setting a second sl-PagingInfo-RemoteUE to a value of "release".

In one embodiment, the information indicating the paging information release may be included in a second RemoteUEInformationSidelink message. The second RemoteUEInformationSidelink message may further include an ID of the Remote UE. The ID of the Remote UE could be the local ID or the Layer-2 ID of the Remote UE.

Referring back to FIGS. 3 and 4, in one exemplary embodiment from the perspective of an Intermediate U2N Relay UE. The Intermediate U2N Relay UE 300 includes a program code 312 stored in the memory 310. The CPU 308 could execute program code 312 to enable the Intermediate U2N Relay UE (i) to establish a first PC5 connection with a Remote UE and establishes a second PC5 connection with a last U2N Relay UE, (ii) to receive paging information from the Remote UE, (iii) to transmit the paging information received from the Remote UE to the last U2N Relay UE, (iv) to detect a radio link failure to the first PC5 connection with the Remote UE, and (v) to transmit information indicating a paging information release associated with the Remote UE to the last U2N Relay UE in response to detecting the radio link failure. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for an Intermediate UE-to-Network (U2N) Relay User Equipment (UE), comprising:
    the Intermediate U2N Relay UE establishes a first PC5 connection with a Remote UE and establishes a second PC5 connection with a last U2N Relay UE;
    the Intermediate U2N Relay UE receives paging information from the Remote UE;
    the Intermediate U2N Relay UE transmits the paging information received from the Remote UE to the last U2N Relay UE, wherein the paging information is included in a first RemoteUEInformationSidelink message;
    the Intermediate U2N Relay UE detects a radio link failure to the first PC5 connection with the Remote UE; and the Intermediate U2N Relay UE transmits information indicating a paging information release associated with the Remote UE to the last U2N Relay UE in response to detecting the radio link failure, wherein the information indicating the paging information release is included in a second RemoteUEInformationSidelink message.

2. The method of claim 1, wherein the paging information is a first sl-PagingInfo-RemoteUE.

3. The method of claim 2, wherein the first sl-PagingInfo-RemoteUE includes a sl-PagingIdentityRemoteUE and a sl-PagingCycleRemoteUE.

4. The method of claim 1, wherein the first RemoteUEInformationSidelink message further includes an identity (ID) of the Remote UE.

5. The method of claim 4, wherein the ID of the Remote UE is a local ID or a Layer-2 ID of the Remote UE.

6. The method of claim 1, wherein the paging information release is indicated by setting a second sl-PagingInfo-RemoteUE to a value of "release".

7. The method of claim 1, wherein the second RemoteUEInformationSidelink message further includes an ID of the Remote UE.

8. The method of claim 7, wherein the ID of the Remote UE is the local ID or the Layer-2 ID of the Remote UE.

9. An Intermediate UE-to-Network (U2N) Relay User Equipment (UE), comprising:
   a control circuit;
   a processor installed in the control circuit;
   a memory installed in the control circuit and coupled to the processor;
   wherein the processor is configured to execute a program code stored in the memory to:
      establish a first PC5 connection with a Remote UE and establishes a second PC5 connection with a last U2N Relay UE;

receive paging information from the Remote UE;
      transmit the paging information received from the Remote UE to the last U2N Relay UE, wherein the paging information is included in a first RemoteUEInformationSidelink message;
      detect a radio link failure to the first PC5 connection with the Remote UE; and
      transmit information indicating a paging information release associated with the Remote UE to the last U2N Relay UE in response to detecting the radio link failure, wherein the information indicating the paging information release is included in a second RemoteUEInformationSidelink message.

10. The Intermediate U2N Relay UE of claim 9, wherein the paging information is a first sl-PagingInfo-RemoteUE.

11. The Intermediate U2N Relay UE of claim 10, wherein the first sl-PagingInfo-RemoteUE includes a sl-PagingIdentityRemoteUE and a sl-PagingCycleRemoteUE.

12. The Intermediate U2N Relay UE of claim 9, wherein the first RemoteUEInformationSidelink message further includes an identity (ID) of the Remote UE.

13. The Intermediate U2N Relay UE of claim 12, wherein the ID of the Remote UE is a local ID or a Layer-2 ID of the Remote UE.

14. The Intermediate U2N Relay UE of claim 9, wherein the paging information release is indicated by setting a second sl-PagingInfo-RemoteUE to a value of "release".

15. The Intermediate U2N Relay UE of claim 9, wherein the second RemoteUEInformationSidelink message further includes an ID of the Remote UE.

16. The Intermediate U2N Relay UE of claim 15, wherein the ID of the Remote UE is the local ID or the Layer-2 ID of the Remote UE.

\* \* \* \* \*